US007996181B2

(12) United States Patent
Kozitsky et al.

(10) Patent No.: US 7,996,181 B2
(45) Date of Patent: Aug. 9, 2011

(54) SYSTEM AND METHOD FOR SENSOR PHASING USING A SUBSTRATE EDGE SIGNAL

(75) Inventors: Vladimir Kozitsky, Rochester, NY (US); Aaron Michael Burry, Ontario, NY (US); Alex Scott Brougham, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 475 days.

(21) Appl. No.: 12/145,847

(22) Filed: Jun. 25, 2008

(65) Prior Publication Data

US 2009/0326863 A1 Dec. 31, 2009

(51) Int. Cl.
*G06F 17/18* (2006.01)

(52) U.S. Cl. ........................................................ 702/179

(58) Field of Classification Search .................... 702/179
See application file for complete search history.

(56) References Cited

U.S. PATENT DOCUMENTS

2008/0237497 A1* 10/2008 Huggins et al. .......... 250/492.22

* cited by examiner

*Primary Examiner* — Tung S Lau

(74) *Attorney, Agent, or Firm* — Luis M. Ortiz; Kermit D. Lopez; Melissa Asfahani

(57) ABSTRACT

A system and method for measuring a substrate edge signal for image sensor phasing. An intermediate transfer substrate edge signal can be effectively mapped by a substrate edge sensor and recorded for at least one complete revolution. A substrate edge signal from an inter-document zone sampled from any region of a substrate in runtime by a process sensor can also be recorded. A comparison or cross-correlation can be applied between the bare intermediate transfer substrate edge signal and the substrate edge signal sensed in the inter-document zone. A cross-correlation algorithm returns a maximum peak value when the two signals are registered in-phase with one another. This information can then be used to register the bare belt process sensor signal and the process sensor signal over the region of interest in-phase with one another. A flat-fielding algorithm can also be applied to the phase-aligned process sensor data to remove artifacts and compensate for substrate (e.g., belt) induced non-uniformities.

6 Claims, 11 Drawing Sheets

SYSTEM AND METHOD FOR SENSOR PHASING USING A SUBSTRATE EDGE SIGNAL

TECHNICAL FIELD

Embodiments are generally related to rendering devices and techniques. Embodiments are also related to substrate edge sensors utilized in the context of rendering devices, such as printers, copiers and the like. Embodiments are additionally related to techniques for measuring a substrate edge signal.

BACKGROUND OF THE INVENTION

Xerography represents one method of copying or printing documents, which can be performed by uniformly charging a charge retentive surface such as a xerographic photoreceptor belt (i.e., a type of substrate). This uniformly charged surface is then preferentially exposed in the desired image areas in order to create an electrostatic latent image of a desired original image. A developing material or a toner can be then deposited onto the latent image to form a developed image. The developed image is then transferred to a final substrate, such as paper. The residual developing material on the surface of the photoreceptor is then cleaned off and the photoreceptor belt surface is then recharged in preparation for the production of another image. Such a methodology is monochrome in nature due to the fact that each image is transferred directly from a photoreceptor to paper. Another approach to copying and/or printing involves the use of an intermediate belt system where one or more colors (e.g., four colors) can be transferred onto a belt and a single transfer to paper is then performed.

The mass of pigment (e.g., toner mass) on an intermediate transfer or photoreceptor belt can be sensed by a full width array (FWA) based sensing application. A belt edge sensor can be used to track the position of the belt with respect to a sensor. By tracking the position of the belt, it is possible to map the belt surface and utilize the map as part of a flat field algorithm to calibrate the FWA sensor signal. Many printing applications require the optical measurement of a toner mass on the belt surface, where the belt surface is not uniform.

A process sensor can be utilized to measure uniformity of the toner on the non-uniform belt substrate. The non-uniformities on the belt surface convolute with the measurement of the toner uniformity and thus the signal-to-noise ratio is reduced. The bare belt surface can be recorded and mapped ahead of time and this information can be used later to compensate the raw data, thereby increasing the signal-to-noise ratio. Such processing, however, requires a fairly precise registration between the measurement signal and the original bare-belt signal.

Once-around and belt-hole signals are commonly utilized to provide reference to a moving substrate such as a photoreceptor or a drum. The once-around signal can be used as a start trigger for data logging or capturing. In a xerographic application, the process patches and targets are often developed in an inter-document zone (IDZ) where the process sensor-sampling period is typically restricted to the IDZ. Thus, depending on the length of the intermediate transfer belt (ITB) and engine speed, there may be multiple inter-document zones for one complete belt revolution.

Typically, the intermediate transfer belts are seamless and the inter-document zone areas do not fall on the same region of the belt; rather, they propagate around the belt during a printing process. Hence, it is necessary to precisely register the data captured by a process sensor during the IDZ with an appropriate region of the bare-belt signal. Prior art printing applications typically utilize additional encoders or position sensors to track the belt movement and to register bare intermediate transfer belt signals to the signal measured for location of interest on the belt.

Based on the foregoing it is believed that a need exists for an improved method and system to register the bare intermediate transfer belt signal to the signal sensed in the region of interest (e.g. inter-document zone) without adding additional hardware.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved rendering device, such as a printer.

It is a further aspect of the present invention to provide for the use of a belt edge signal sensor for image sensor phasing utilized in the context of a rendering device.

It is another aspect of the present invention to provide for an improved method and system for registering bare intermediate transfer belt signals to a signal detected in an inter-document zone (IDZ) region in the context of a rendering device.

The aforementioned aspects and other objectives and advantages can now be achieved as described herein. A system and method for measuring a belt edge signal for image sensor phasing is disclosed. An intermediate transfer belt edge signal can be effectively mapped by a belt edge sensor and a process sensor, and both can be recorded for at least one complete revolution. A belt edge signal sampled over an inter-document zone region of a belt, concurrently sampled by the process sensor, can be recorded in runtime. A cross-correlation can be applied between the bare intermediate transfer belt edge signal and the belt edge signal sensed in the inter-document zone. The cross-correlation algorithm returns a maximum peak value when the two signals are registered in-phase with one another.

The number of samples or time required to capture one complete revolution can be determined from the process speed, the sampling rate, and the actual length of the belt. The belt edge signal can be utilized to determine the belt length by finding the period of the belt edge data. An index of the maximum peak value can be determined in order to precisely align the bare intermediate transfer belt edge signal and the belt edge signal captured during the recording of the process sensor measurement of the patch of interest on the belt. The offset can then be utilized to determine the proper alignment of the bare belt and patch signals for the process sensor. Once properly aligned, a flat-fielding algorithm can be applied to remove artifacts and compensate for non-uniformities in the process sensor signal over the region of interest on the belt. If the process sensor sampling rate is not equal to the belt edge sensor-sampling rate, a proper conversion factor can be added to the cross-correlation algorithm.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1A:
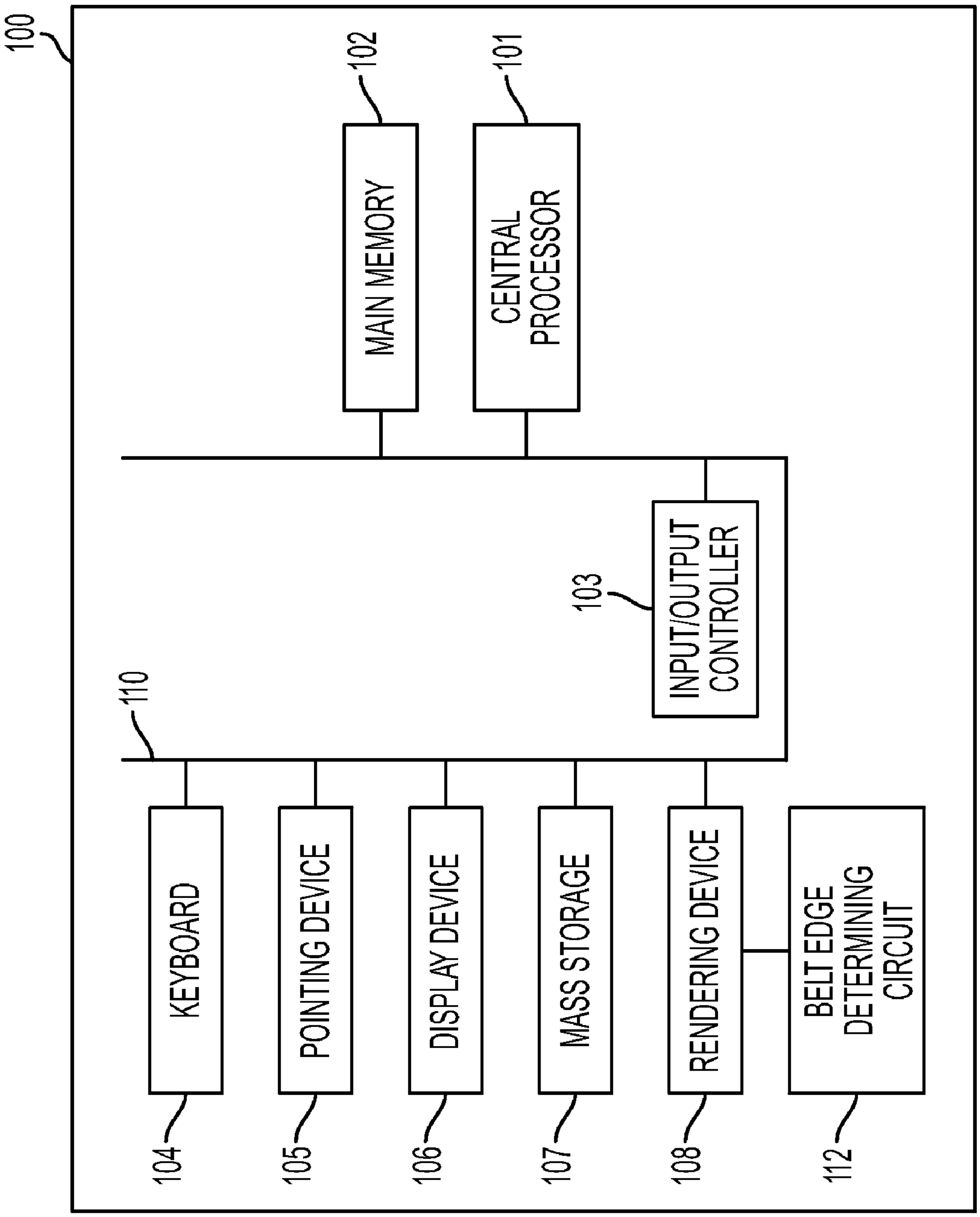
FIG. 1 illustrates a schematic view of a data-processing apparatus in which the present invention may be embodied, in accordance with a preferred embodiment.
Figure 1B:
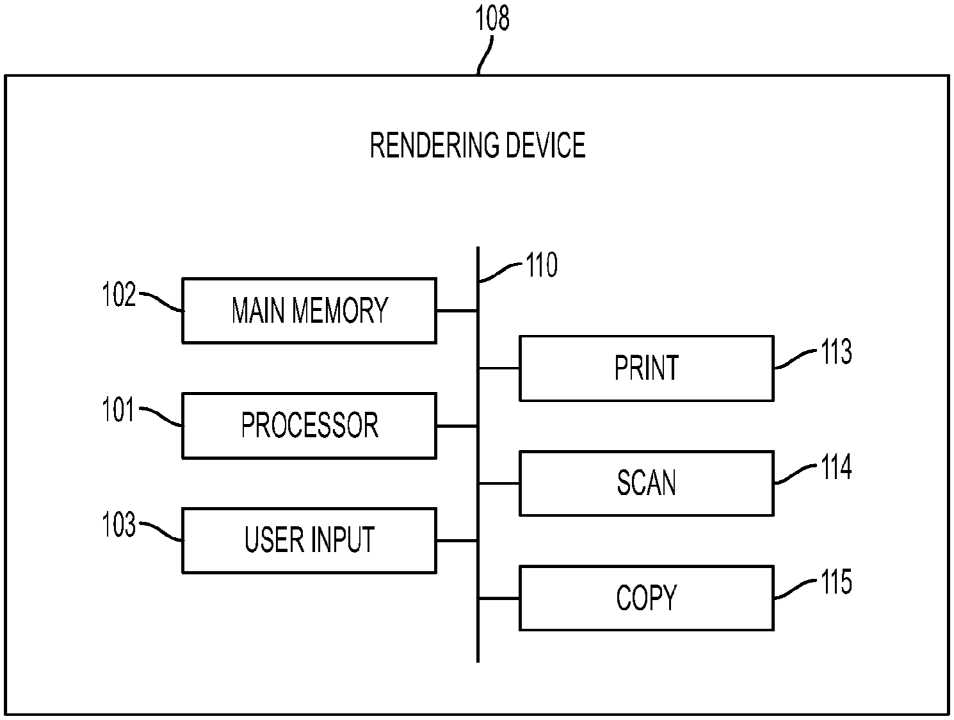

FIGS. 1(*a*)-1(*b*) are provided as exemplary diagrams of data-processing environments in which the present invention may be embodied. It should be appreciated that FIGS. 1(*a*)-1(*b*) are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1(*a*), the present invention may be embodied in the context of a data-processing system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, may be included in the data-processing system 100 as desired. As illustrated, the various components of the data-processing system 100 communicate through a system bus 110 or similar architecture. Note that rendering device 108 may constitute, for example, a printer, a copier, fax machine, scanner, and/or other types of rendering components, depending upon design considerations. It can be appreciated that the methodology discussed herein may be implemented in the context of data-processing system 100 and/or within the context of device 108 (e.g., a copier and/or printer). Note that the rendering device 108 generally includes a belt edge determining circuit 112.

As depicted in FIG. 1(*b*), in accordance with an alternative embodiment, the present invention may be implemented within the rendering device 108. Note that in FIGS. 1(*a*) to 1(*b*), identical or similar parts or elements are generally indicated by identical reference numerals. Thus, the rendering device 108 illustrated in FIG. 1(*b*) typically includes a main memory 102, a processor 101, and a user input component 103 for entering instructions to rendering device 108 in order to implement particular instructions and operations such as print 113, scan 114, and/or copy 115. The various components depicted in FIG. 1(*b*) communicate with one another via a system bus 110.

Figure 2:
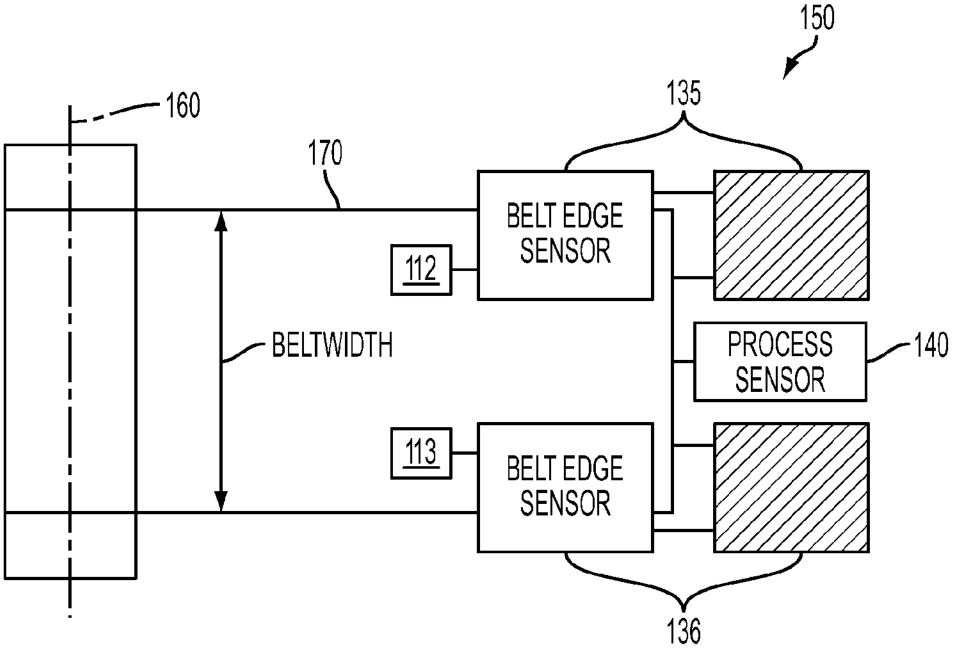
FIG. 2 illustrates a perspective view of a belt-testing device, which can be implemented in accordance with an preferred embodiment.

FIG. 2 illustrates a perspective view of a belt-steering device 150, which can be implemented in association with the data-processing system 100 depicted in FIG. 1(*a*) and/or the rendering device 108 illustrated in FIG. 1(*b*), in accordance with one possible embodiment. The belt-steering device 150 generally includes a roller 160 for rolling a belt 170, at least one process sensor 140 and one or more belt edge sensors 135, 136. The belt edge sensors 135, 136 can be associated with the rendering device 108 for measurement of the location of the edge of the belt 170. The belt edge sensor 135 is generally associated with a belt edge determining circuit, such as, for example, circuit 112. The belt edge sensor 136 can also be associated with a belt edge determining circuit 113.

It can be appreciated that in some embodiments, the use of only one belt edge sensor and/or process sensor may be necessary, whereas in other embodiments multiple sensors may be desirable. Note that belt 170 constitutes one type of substrate in accordance with the present invention. Thus, a belt edge signal as discussed herein is merely one type of substrate edge signal. It can be appreciated that use of a belt such as belt 170 as discussed herein is presented for general illustrative purposes only. Other types of substrates and substrate edge sensors, and so forth, may be implemented in accordance with alternative embodiments.

The rendering device 108 generally includes the use of a belt edge determining circuit such as, for example circuits 112 and/or 113, which are utilized to adjust the test belt 170 to a desired testing position by adjusting the position of the movable roller 160. The process sensor 140 can be utilized to measure density and/or uniformity of the pigment (e.g., toner) on the non-uniform belt substrate 170. Note that process sensor 140 can be implemented as an optical full width array sensor (FWA) device or an optical point sensor such as an Enhanced Toner Area Coverage (ETAC) device, or other appropriate process sensor for one complete revolution of belt 170. Process sensor 140 may be a point sensor, an image sensor, and/or another similar type of suitable process sensor, depending upon design considerations. The belt edge sensors 135, 136 are utilized to detect the rotating belt edge 170 and generate signals of the belt edge position as output. The belt edge sensor 135 can be utilized to track the position of the belt 170. It is possible to map the belt edge by tracking the position of the belt 170 for at least one full revolution.

In general, a belt edge signal can be utilized as a quasi-encoder of the position of belt 170. Initially, on cycle-up, the output of the belt edge sensors 135 and/or 136 can be logged, along with the output of the process sensor 140 for one complete belt revolution. The number of samples or time required to capture one complete revolution of belt 170 can be determined from the process speed, the sampling rate, and the actual length of belt 170. Using the belt edge signal(s) generated by belt edge sensors 135, 136 along with data output from process sensor 140, one can also determine the belt length by determining the period of the belt edge data.

Once the belt-edge and bare-belt process sensor data for at least one complete revolution of the bare belt 170 is recorded, this data can be saved for subsequent lookup. In operation, as data is recorded from an IDZ zone or more generally, from any region of interest on belt 170 by a process sensor such as process sensor 140, the belt edge data is preferably recorded as well. By then carrying out a cross-correlation (e.g., see block 314 of FIG. 3) of the belt edge signal captured during the process sampling period (e.g., IDZ, etc.) to the previously recorded signal of edge position for at least one revolution, a peak value can be obtained with respect to an index into the original one-revolution map registering the sampled area to the bare belt map. In other words, the utilized cross-correlation algorithm can return to a maximum when the two signals are registered in phase with one another. Once the index into the original surface map is obtained, this information can be used to phase align the process sensor signal data over the region of interest with the bare belt process sensor signal data recorded previously. A flat-field algorithm (e.g., see block 318 of FIG. 3) can then be applied to remove artifacts and compensate for belt-substrate induced non-uniformities in the process sensor data for the region of interest.

Figure 3:
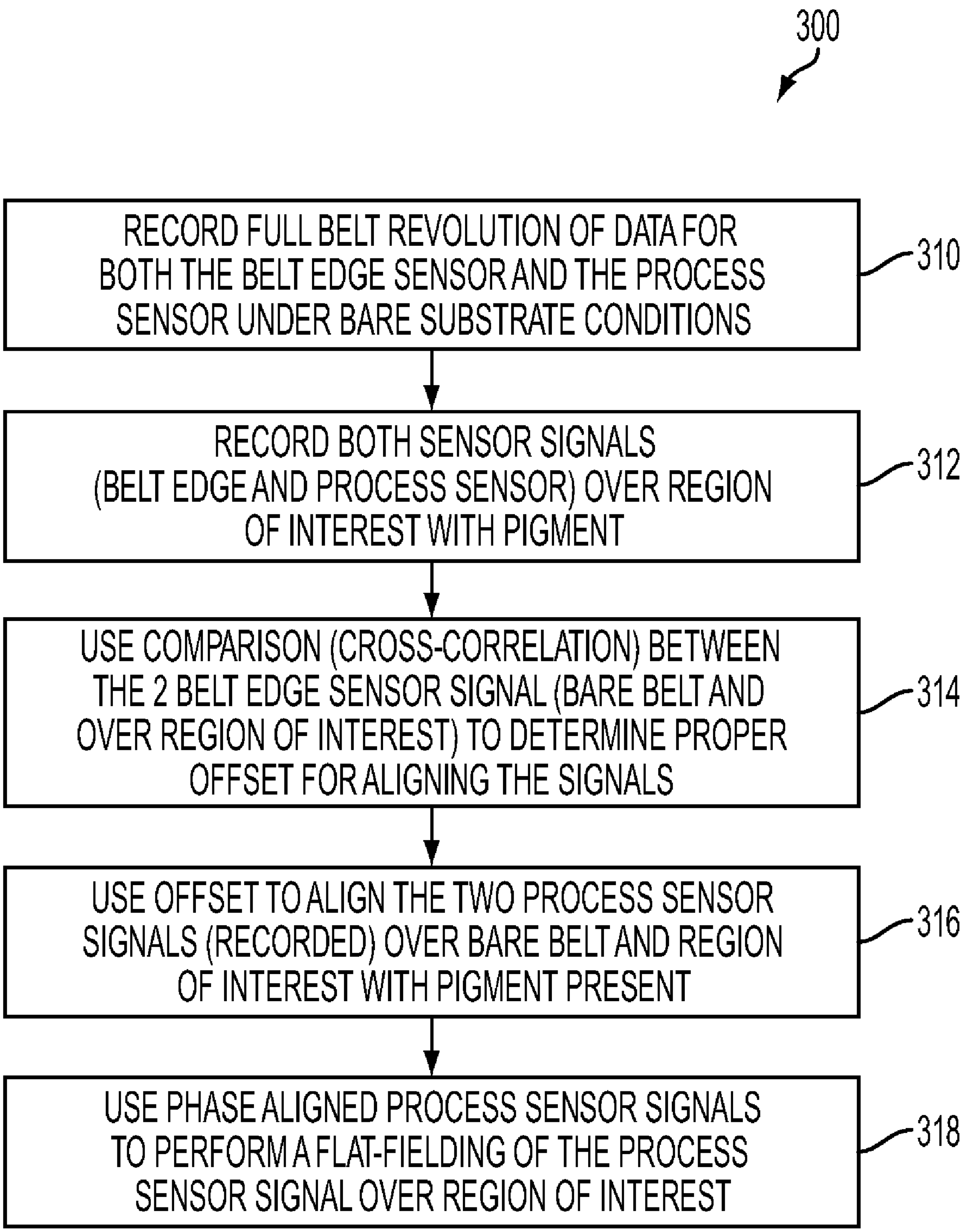
FIG. 3 illustrates a flow chart of operations illustrating logical operational steps of a method for utilizing belt edge signals for image sensor phasing, in accordance with a preferred embodiment.

FIG. 3 illustrates a flow chart of operations illustrating logical operational steps of a method 300 for utilizing belt edge signals for image sensor phasing, in accordance with a preferred embodiment. Note that in FIGS. 1-4, identical or similar parts are indicated by identical reference numerals. As indicated at block 310, an intermediate transfer belt signal from the belt edge sensors 135, 136 along with the output from process sensor 140 are mapped for at least one complete revolution. In other words, at least one complete revolution can be recorded using both signal (i.e., signals output from belt edge sensors 135, 136 and output from process sensor 140). The operation illustrated at block 310 thus involves recording at least a full substrate (e.g., belt 170) revolution for both the belt edge sensors 135, 136 and the process sensor 140 under bare substrate (e.g., belt) conditions.

Following the process of the operation depicted at block 310, a belt edge signal and process sensor signal from a region of interest (e.g., IDZ area) sampled from any region of the belt 170 at run time by process sensor 140 and belt edge sensors 135, 136 can be recorded, as depicted at block 312. That is, the operation illustrated at block 312 involves recording both sensor signals (i.e., belt edge and process sensor) over the region of interest with the pigment (e.g., toner mass) present that is being measured. Thereafter, as illustrated at block 314, an operation can be processed in which a comparison algorithm (e.g., cross-correlation) is applied between the two belt edge sensor signals (i.e., bare belt/substrate and over the region of interest) to determine the proper offset for aligning the signals. The cross-correlation can thus be applied between the bare intermediate transfer belt edge signal and the belt edge signal sensed in the IDZ or appropriate region of interest on the substrate (e.g., belt 170). The cross-correlation algorithm returns a maximum peak value when the two signals are registered in-phase with one another. An index of the maximum peak value can be determined in order to precisely align the two sets of belt edge signals.

The offset determined as a result of processing the instructions indicated at block 314 can be used to align the two process sensor signals (i.e., recorded over the bare belt and the region of interest with pigment present), as illustrated next at block 316. Thereafter, as depicted at block 318, the phase aligned process sensor signals can be utilized to perform a flat-fielding (via a flat fielding algorithm) of the process sensor signal over the region of interest. This assists in eliminating non-uniformities of the bare substrate from the signal of interest (i.e., the process sensor response to the pigment on the belt). The flat-fielding algorithm can also be applied to remove artifacts and compensate for belt and/or substrate induced non-uniformities, as depicted at block 318.

Figure 4:
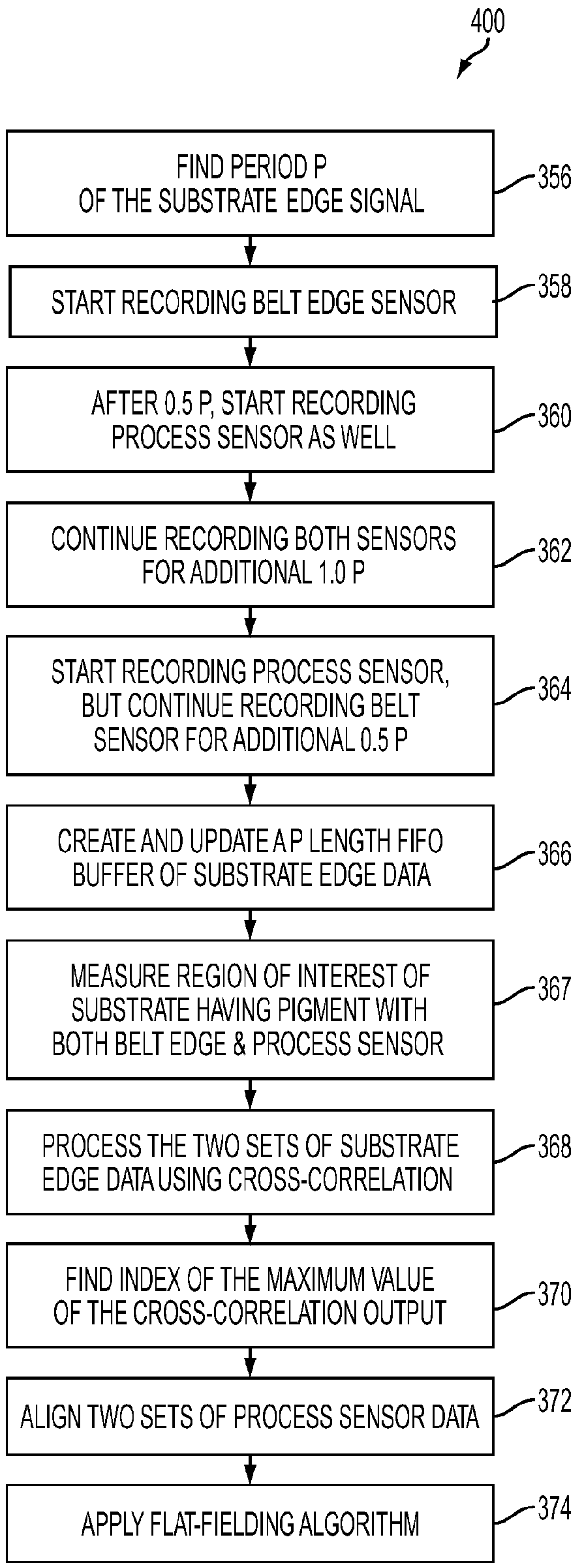
FIG. 4 illustrates a detailed flow chart of operations illustrating logical operational steps of a method for utilizing belt edge signals for image sensor phasing, in accordance with a preferred embodiment.

FIG. 4 illustrates a detailed flow chart of operations illustrating logical operational steps of a method 400 for utilizing belt edge signals for image sensor phasing, in accordance with a preferred embodiment. As indicated at block 356, an operation can be implemented to determine the period P of the substrate edge signal. The period P of the substrate edge signal can be determined utilizing the length of the substrate (e.g., belt 170), the substrate velocity and the sampling rate of the substrate edge sensor (e.g., sensors 135, 136), as demonstrated by equation (1) below:

$$P = \frac{\text{Belt\_Length}}{\text{Belt\_Speed}} * \text{Sampling\_Rate} \tag{1}$$

Similarly, the period can be calculated by computing a lowest dominant frequency of the substrate edge signal from multiple revolutions. Next, as depicted at block 358, an operation can be implemented to begin recording belt edge sensor data. Thereafter, as illustrated at block 360, the substrate edge signal(s) can be recorded for 0.5 P. After 0.5 P, recording of the process sensor can also begin. While continuing to record the substrate edge signal(s), the process sensor bare belt is also recorded for the next 1.0 P, as indicated at block 362. At this point, the recording of the process sensor signal is terminated, but the belt edge sensor(s) are recorded for an additional 0.5 P, as described at block 364. The end result is a 2 P length vector of data for the belt edge sensor(s) and a 1.0 P length array of bare belt process sensor data.

Next, as indicated at block 366, an operation can be implemented to create and update a P length FIFO buffer of substrate edge data. Thereafter, as depicted at block 367, a region of interest having pigment (e.g., toner mass) on a surface of the substrate, can be measured and captured by both sensors. Following the process of the operation depicted at block 367, an operation can be implemented in which the two sets of substrate edge data are processed using a comparison or cross-correlation algorithm, as indicated by block 368. Next, as indicated at block 370, an operation can be implemented for determining the index of the maximum value of the cross-correlation output. Thereafter, as indicated at block 372, the two sets of process sensor data can be aligned. Finally, as illustrated at block 374, the flat-fielding algorithm can be applied, as described previously.

In general, the belt edge data of the belt edge sensor 135 for two revolutions can be recorded, as indicated by the method 400 depicted in FIG. 4. After using this information for determining the period P, 2*P samples of substrate or belt edge data can be recorded within which 1*P of the time can be spent for recording the bare belt map with a process sensor 140. A preferred embodiment would be to record this information during a cycle-up period of the rendering device 108.

Figure 5:
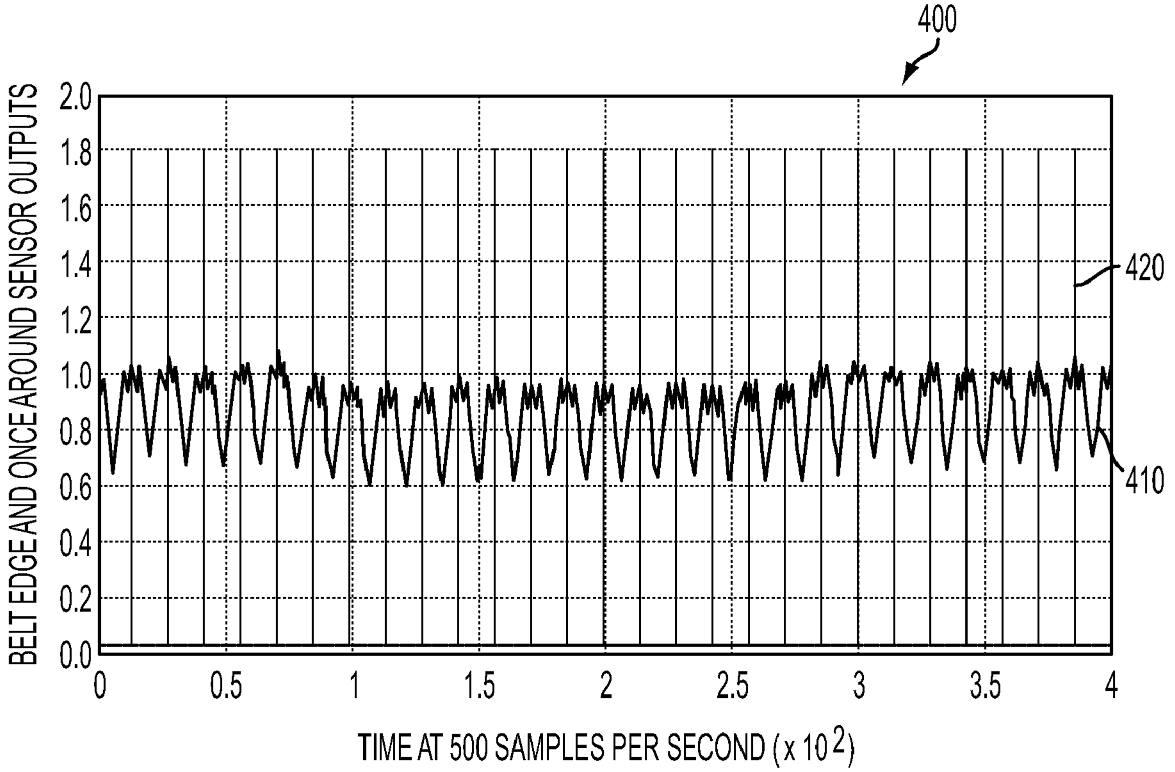
FIG. 5 illustrates a plot of the belt edge data for multiple belt revolutions, which can be implemented in accordance with a preferred embodiment.

FIG. 5 illustrates a plot 400 of the belt edge data for multiple belt revolutions, which can be implemented in accordance with a preferred embodiment. The signal trace 410 depicted in FIG. 5 illustrates an output signal of the belt edge sensor 135 and the signal trace 420 depicts an output signal of a once around sensor in order to illustrate the periodicity of a belt edge sensor data. The frequency can be computed from FIG. 5 and can be inverted to yield period P. The period P for of the belt edge signal shown in FIG. 5 is 1420.

Figure 6:
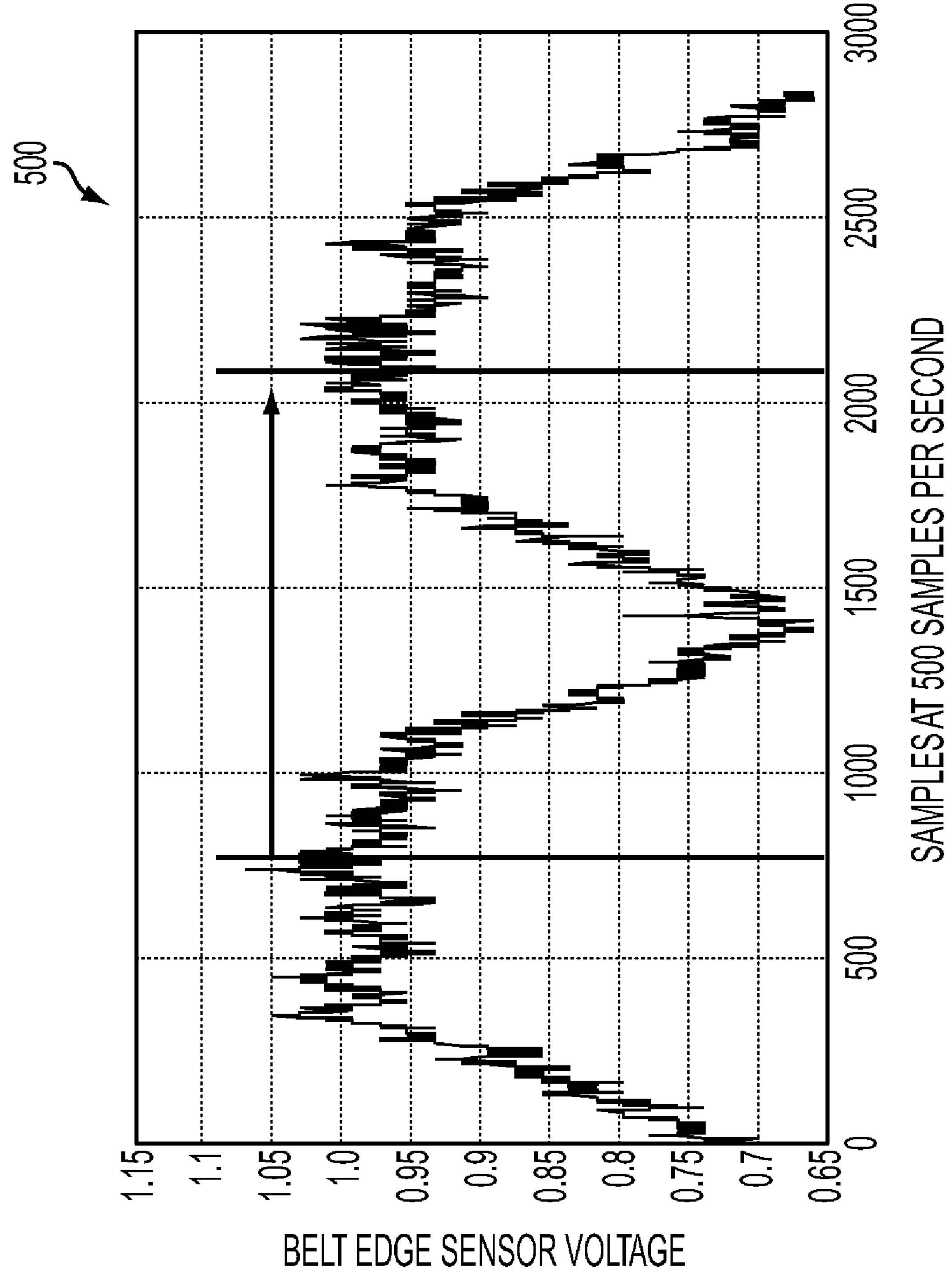
FIG. 6 illustrates a plot of the belt edge data for two complete revolutions for 2840 samples, in accordance with a preferred embodiment.

FIG. 6 illustrates a plot 500 of the belt edge data for two complete revolutions for 2840 samples, in accordance with a preferred embodiment. The recording of the bare belt edge data starts at 0.5 P or 710 samples and ends 1.5 P or 2130 samples, as shown in FIG. 6. The recording of the samples can be continued until 2 P or 2840 samples of the belt edge data is acquired, as depicted at FIG. 6. The 2 P length belt edge vector and the P length bare belt process sensor data can be saved. A P length FIFO buffer of belt edge data termed as runtime can be created and updated, as depicted previously at block 366 of FIG. 4.

Figure 7:
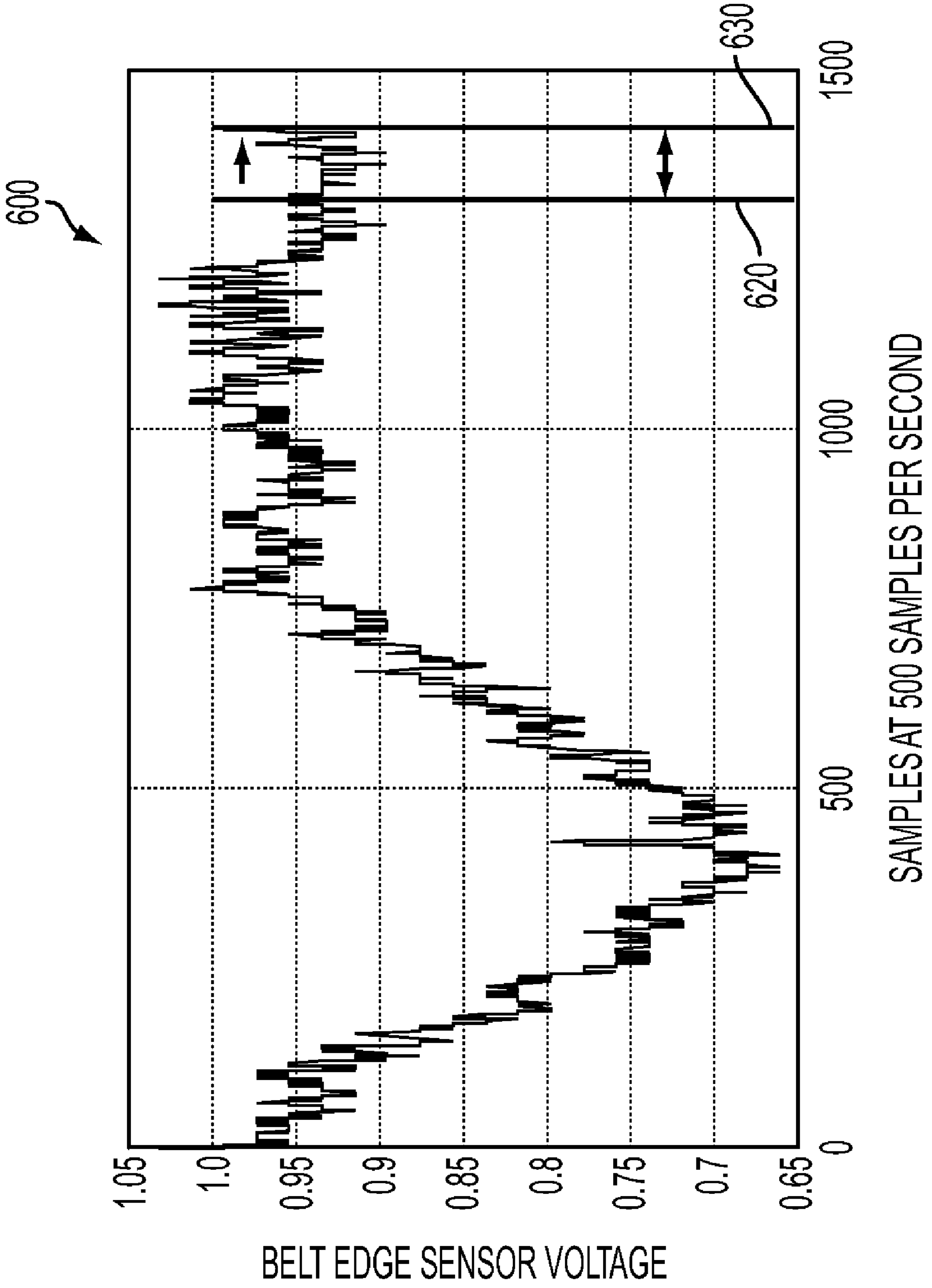
FIG. 7 illustrates a plot of the belt edge data for one complete revolution for a particular number of samples with a process sensor sampling a limited region as defined, in accordance with a preferred embodiment.

FIG. 7 illustrates a plot 600 of the belt edge data for one complete revolution for 1420 samples, which can be implemented in accordance with a preferred embodiment. Whenever the process sensor 140 samples the toner on the belt 170, the data from the belt edge sensor 135 in the runtime FIFO can be saved. The recording of the process sensor data starts at a starting point 620 and ends at an ending point 630. In other words, a running FIFO of data with respect to the edge sensor can be maintained. Additionally, the process sensor is recorded during the IDZ only. The belt edge data is constantly being streamed into the FIFO. The duration in belt-edge counts between the starting and the ending point 620 and 630 during which the process sensor 140 samples the belt can be termed as X, which is equal to 100 counts. The calibration algorithm can be started as soon as the process sensor 140 stops sampling the belt 170. The two sets of belt edge data obtained from FIG. 6 and FIG. 7 can be processed using cross-correlation, as depicted at block 368 of FIG. 4. It is important to note, however, that the belt edge data utilized for the cross correlation is the original 2 P from the bare-belt capture operation described earlier and the P length FIFO data, not merely what was captured within the IDZ.

Figure 8:
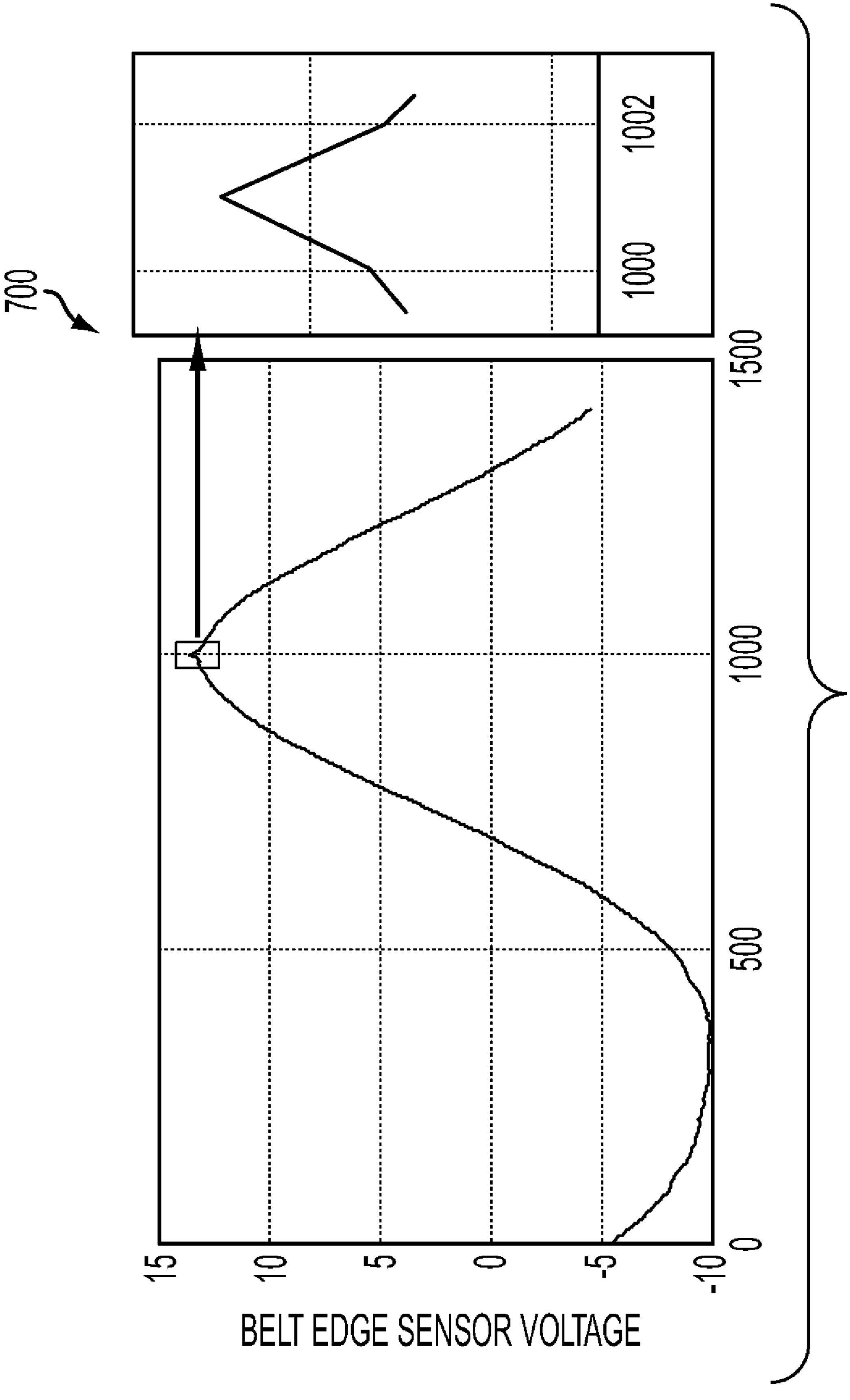
FIG. 8 illustrates a plot of belt edge data, which is result of a cross-correlation between signals depicted in FIG. 2 and FIG. 3, in accordance with a preferred embodiment.

FIG. 8 illustrates a plot 700 of the cross-correlation between signals in FIGS. 6-7, which can be implemented in accordance with a preferred embodiment. The two sets of edge data can be processed to register the section of the belt sampled in run-time to the entire map captured at cycle-up using the belt edge data. This can be carried out by cross-correlating the two sets of belt edge data.

FIG. 8 depicts the output of the cross-correlation in which the first and last P points are discarded. The cross-correlation computation of the first and last P data points are meaningless as they are typically computed utilizing zero-padded values of the input signals hence these points can be discarded. It is only until P points into the cross-correlation computation that the results start becoming meaningful as actual points start to overlap.

The index I can be found from the cross-correlation output, as shown at block 370 of FIG. 4. The index of the maximum value of the cross-correlation output of the reduced set of data can be found. In FIG. 8, the index I occurs at 1001 counts and thus the index I can be 1001. The index is the starting point of the run-time belt edge position within the cycle up full surface map. The two sets of belt edge data can be phase aligned, as illustrated at block 372 of FIG. 4.

The index value I obtained from FIG. 8 and the X value from FIG. 7 can be utilized to precisely align the two sets of process sensor signal data (i.e., the previously recorded bare belt data and the data recorded for the region of interest with pigment, such as toner mass). The run-time surface sampling can be done at the end with respect to the P length edge-vector, and using the fact that the belt edge data is periodic with period P. The belt position corresponding to the start of process sampling for run-time mode are shown in equations (2) and (3).

$$\text{Starting Sample: } I-X-1 \tag{2}$$

$$\text{Ending Sample: } I-1 \tag{3}$$

If the values from equations (2) and (3) are both greater than 1.5 P, then exploiting periodicity, these values can be reduced by P so that the start and stop samples fall into the 0.5 to 1.5 P section where the bare belt map can be actually captured. If the starting sample is less then 1.5 P but the ending sample is not, then the samples from the result of equation (2) can be utilized to 1.5 P as the first part of the belt surface map and the remaining X−1.5 P samples from 0.5 P onward. By applying the I value and X value from FIG. 7 and FIG. 8 to equation (2) and equation (3) yields 900 and 1000 respectively which is less than 1.5 P or 2130

Figure 9:
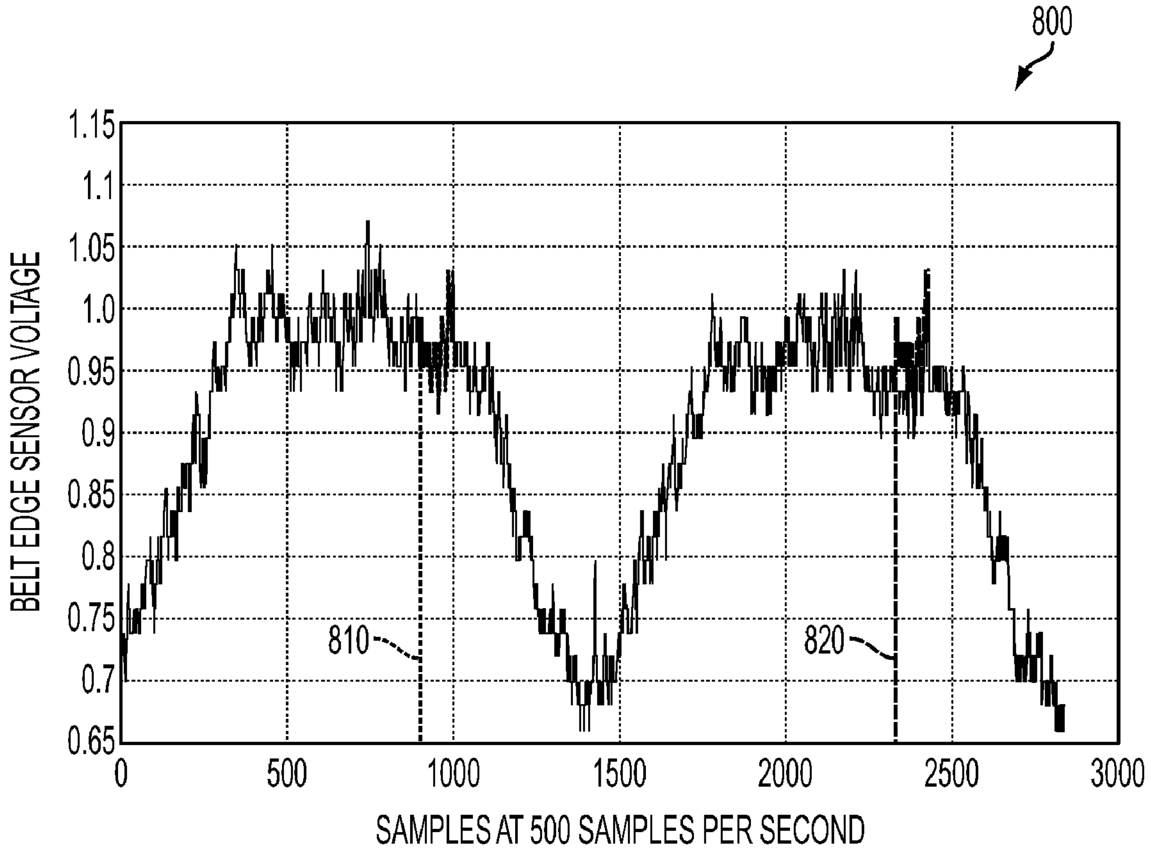
FIG. 9 illustrates a plot of positional phase alignment across two complete belt revolutions, which can be implemented in accordance with a preferred embodiment.

If the process sensor-sampling rate is not equal to the belt edge sensor-sampling rate then proper conversion factor must be added to the alignment algorithm. FIG. 9 illustrates a plot 800 of phase alignment between two belt edge signals, which can be implemented in accordance with a preferred embodiment. The section 810 within the 0.5 P to 1.5 P limits is a perfect match. The section 820 is a match P samples away and while the phase is correct, the effects of belt movement in the form of a voltage shift and belt edge sensor noise are illustrated in FIG. 9. The P length vector of edge information in run-time mode can be saved to improve the result of the cross-correlation algorithm.

Figure 10A:
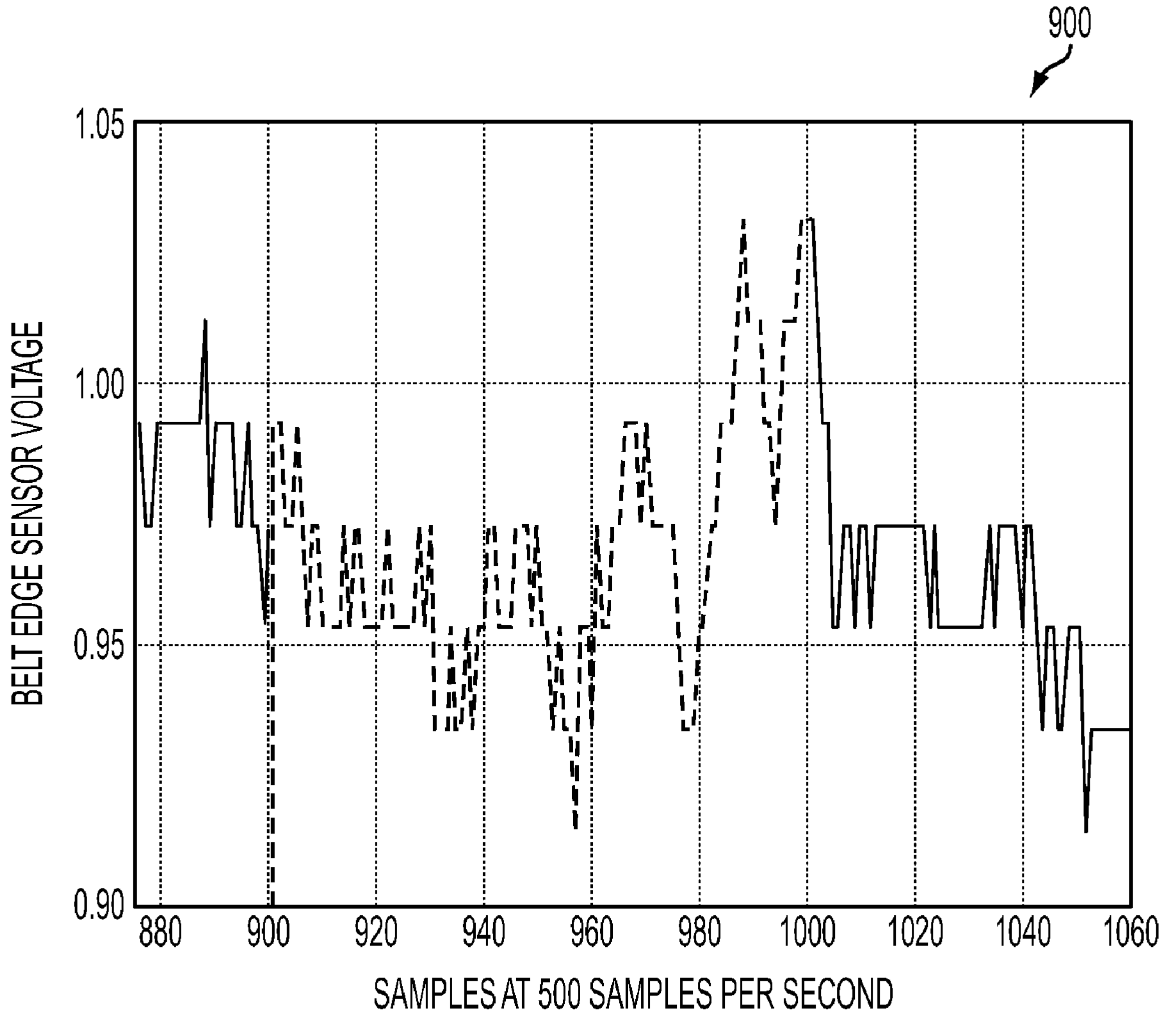
FIGS. 10A-10B illustrates a plot of phase alignment between two belt edge signals, in accordance with a preferred embodiment.
Figure 10B:
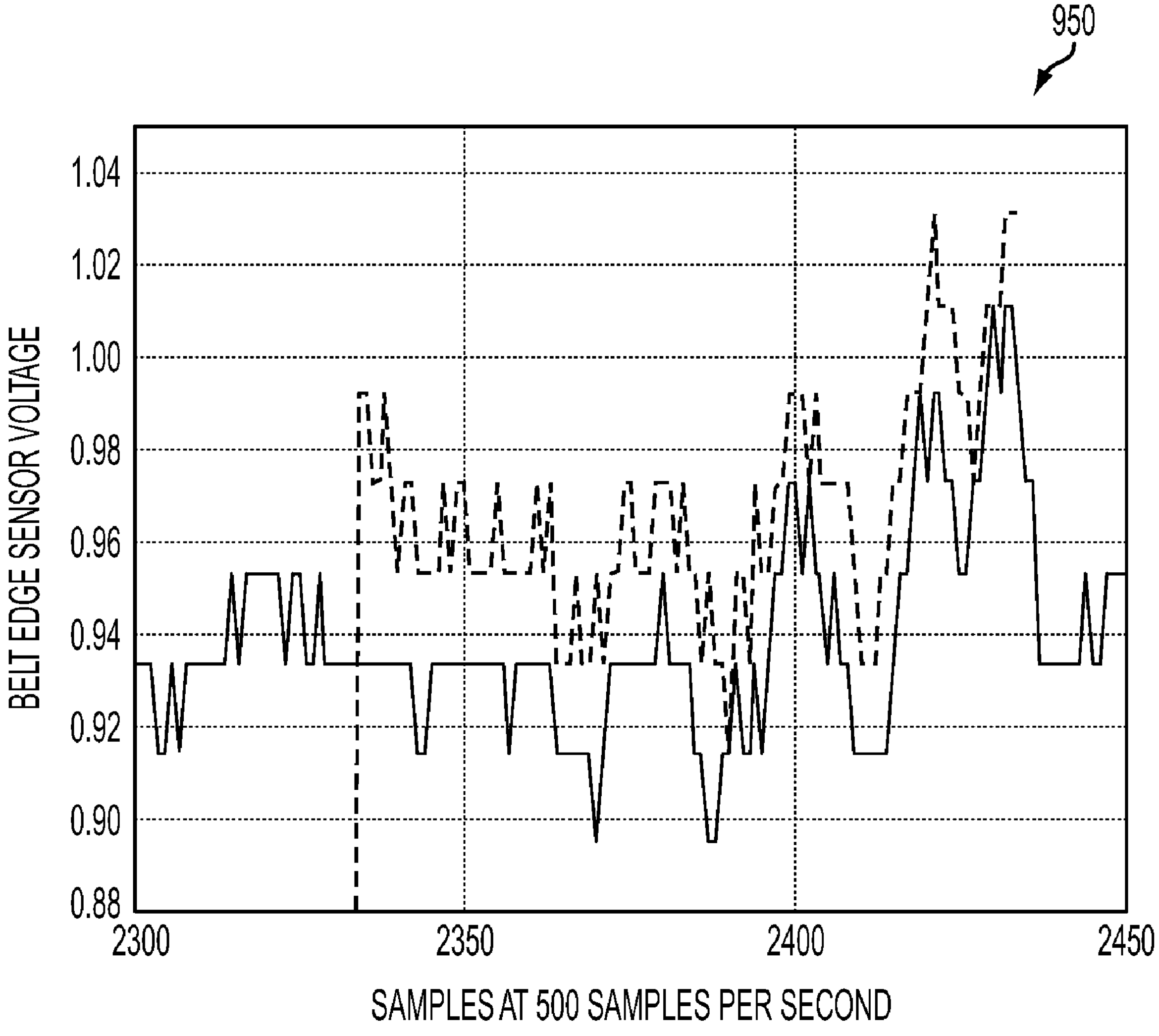

The longer belt edge data provides a precise match independent of the noise, which does not dominate the signal. Further, by requiring a P length vector of edge data instead of edge data only when the process sensor 140 is sampling ensures that the cross-correlation algorithm does not err with too few samples where a pattern match cannot be established and the maximum value of a cross-correlation output is not distinct but flat. FIGS. 10A and 10B illustrates a plot of phase alignment between two belt edge signals, which can be implemented in accordance with a preferred embodiment. It is believed that by utilizing the method 300 described herein, enables accurate flat-field compensation which removes bare-belt non-uniformities for the process sensor signals, thereby increasing the fidelity of the resulting toner mass signal.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for sensor phasing, comprising:

implementing a comparison algorithm via a computer-implemented system comprising a processor, a data bus coupled to said processor, and a computer-usable medium embodying computer code, said computer-usable medium being coupled to said data bus, said computer program code comprising instructions executable by said processor, with respect to a photoreceptor substrate edge signal in at least one complete revolution of a photoreceptor substrate and said photoreceptor substrate edge signal sensed in a region of interest of said photoreceptor substrate, wherein said comparison algorithm returns a best comparison when said photoreceptor substrate edge signal in said at least one complete revolution of said photoreceptor substrate and said photoreceptor substrate edge signal sensed in said region are registered in-phase with one another;

utilizing information output from said comparison algorithm to phase align a process sensor with respect to a bare photoreceptor substrate and said region of interest via said computer-implemented system; and applying a normalization algorithm to said process sensor signal using a bare photoreceptor substrate signal to remove artifacts and compensate for non-uniformities via said computer-implemented system, thereby increasing a fidelity of a resulting marked photoreceptor substrate signal from said process sensor.

2. The method of claim 1, further comprising:

recording said bare photoreceptor substrate signal from said photoreceptor substrate edge sensor with respect to a photoreceptor substrate via said computer-implemented system;

recording a photoreceptor substrate edge signal output from said photoreceptor substrate edge sensor for said at least one complete revolution of said photoreceptor substrate via said computer-implemented system; and recording a marked photoreceptor substrate signal from a region of said photoreceptor substrate concurrent with recording said photoreceptor substrate edge signal via said computer-implemented system.

3. The method of claim 1 wherein said comparison algorithm processes a cross-correlation via said computer-implemented system between said photoreceptor substrate edge signal in said at least one complete revolution of said photoreceptor substrate and said photoreceptor substrate edge signal sensed in said region.

4. The method of claim 1 wherein said non-uniformities comprise photoreceptor substrate-induced non-uniformities.

5. The method of claim 1 further comprising determining an index of said maximum peak value via said computer-implemented system in order to precisely align a said bare photoreceptor substrate process sensor signal and said process sensor signal for a toned photoreceptor substrate region of said photoreceptor substrate.

6. The method of claim 5 further comprising adding a proper conversion factor to said comparison algorithm via said computer-implemented system if a sampling rate of said process sensor is not equal to a sampling rate of said photoreceptor substrate edge sensor.

* * * * *